P. A. Wilson.
Sash Balance.
N° 89,821. Patented May 4, 1869.

Witnesses:
Wm A Steel
John Parker

Inventor:
P. A. Willson
by his Attorney
Henry Howson

United States Patent Office.

P. A. WILLSON, OF CAMDEN, NEW JERSEY, ASSIGNOR TO HIMSELF, MATTHEW WHILLDIN, AND ALBERT ATWOOD, OF SAME PLACE.

Letters Patent No. 89,821, dated May 4, 1869.

IMPROVED SASH-BALANCE.

The Schedule referred to in these Letters Patent and making part of the same.

*To all whom it may concern:*

Be it known that I, P. A. WILLSON, of Camden, New Jersey, have invented certain Improvements in Window-Frames and Sashes, and attachments for the same; and I do hereby declare the following to be a full, clear, and exact description of the same.

My invention consists of an economical arrangement of cords and friction-pulleys, fully described hereafter, by which window-sashes may be as effectually balanced as by the ordinary weighted cords, without the necessity of boxing the window-frames for the reception of the weights.

In order to enable others skilled in the art to make and apply my invention, I will now proceed to describe its construction and operation, reference being had to the accompanying drawing, which forms a part of this specification, and in which—

Figure 1:
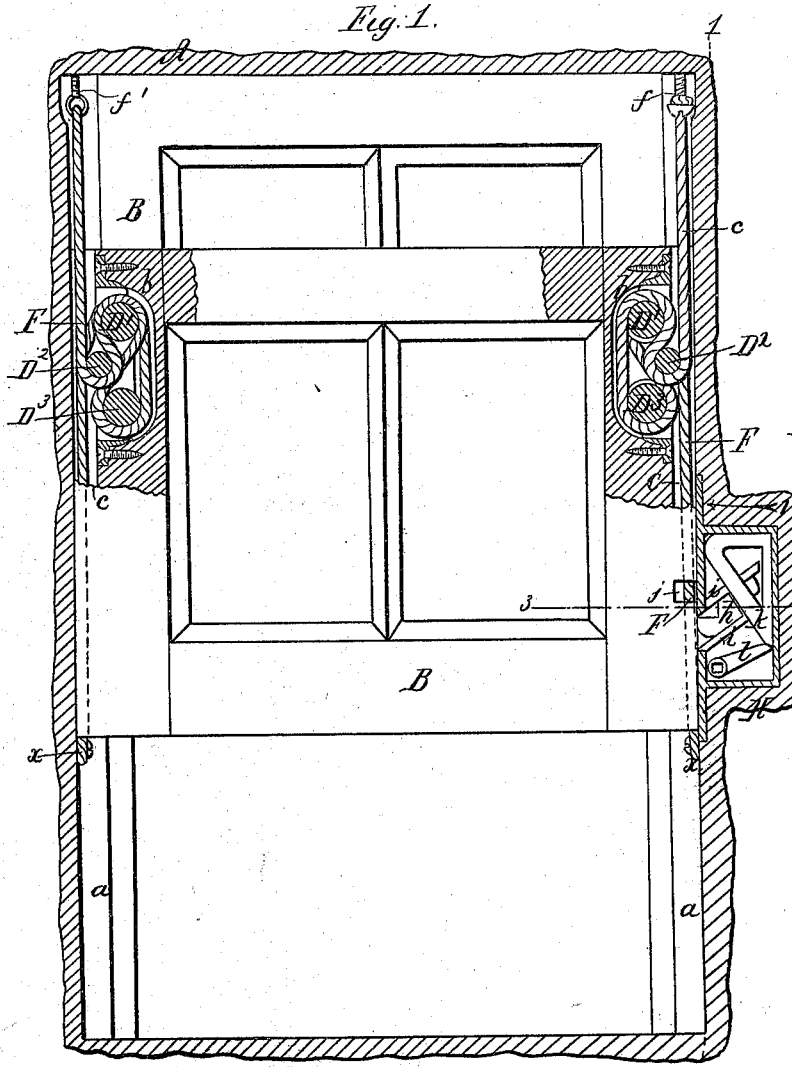
Figure 2:
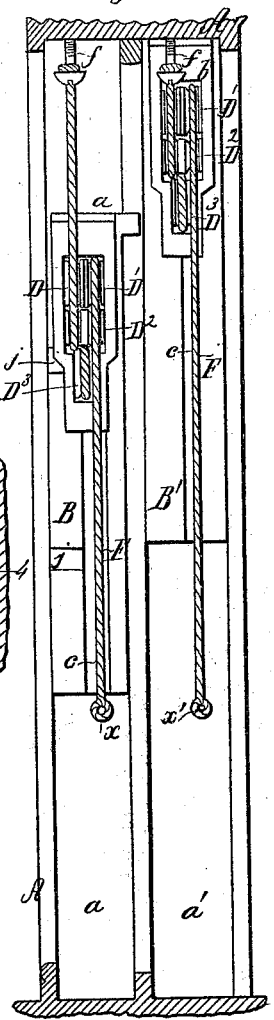
Figure 3:
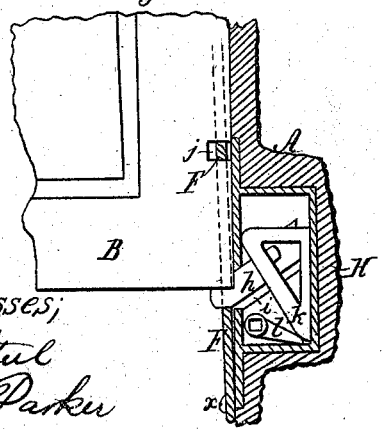
Figure 4:
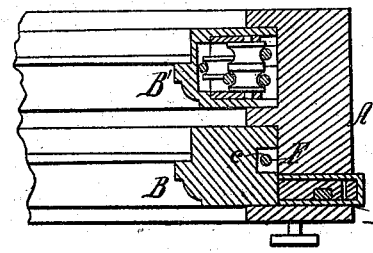

Figure 1 is a front view, partly in section, of a window-frame with my improvement;

Figure 2, a sectional view of the same, on the line 1-2, fig. 1, looking in the direction of the arrow;

Figure 3, a view of a portion of fig. 1, with the front sash raised to its full extent; and Figure 4, a sectional plan view of the frame, on the line 3-4, fig. 1, showing the sashes adjusted to different positions.

Similar letters refer to similar parts throughout the several views.

A represents a portion of a window-frame, in which are the usual vertical ways $a$ and $a'$, for the reception of the edges of the front and back sashes B and B'.

The objection to the usual arrangement of cords and balancing-weights, for maintaining the sashes in any position to which they may be raised or lowered, is the expense incurred in boxing the window-frames for the reception of the weights, and to overcome this objection I employ a combination of cords and friction-pulleys, arranged as I will now proceed to describe.

The edges of each of the sashes, near to the upper ends of the same, are recessed for the reception of a metal case, $b$, and in each of the latter there are in the present instance four grooved pulleys D D' D² D³, the two former of which are placed side by side, and arranged to turn upon the same spindle, while the pulley D² has duplicate grooves, as best observed in fig. 2.

A cord, F, is secured to the top of the window-frame, within each of the ways $a$ and $a'$, from which it passes downwards through a groove, $c$, formed on the edge of the sash; thence around the friction-pulleys D D' D² D³, as seen in figs. 1 and 2, and through the remainder of the groove $c$, to about the point $x$, where the opposite end of the cord is permanently secured to the window-frame by a screw or other fastening.

The cords, when thus secured at both ends to the window-frame, and arranged to pass around the pulleys D, will not interfere with the free motion of the sashes, the friction caused between the said cords and the pulleys being only sufficient to overcome the weight of the sashes, so that they may be balanced and maintained in any required position as effectually as by the ordinary arrangement of weights and cords.

Should it be found, however, that from the slackening of the cords, or other causes, the sashes are not properly balanced, the friction upon the pulleys can be readily increased to the required degree by tightening the cords by means of the set-screws $f$, which fasten their upper ends to the window-frames, and I prefer that the set-screws should be provided with swivel-rings, as seen at $f'$, fig. 1, so that the cords may not become twisted while being tightened.

For the purpose of fastening the sashes when closed, or when opened to a slight extent for the admission of air, &c., I employ the lock shown in the drawing, which consists of a metal case, H, secured within a recess of the window-frame, and having a bolt, $h$, which is arranged to slide diagonally between grooves $i\ i$, in such a manner that, when its notched end projects from the said case, it shall pass beneath the sash, as shown in fig. 3, or enter one of the notches $j$ formed on the edge of the same.

The bolt $h$ of the lock is operated by a weight, $k$, and by an arm, $l$, whose spindle is turned from the inside of the window $i$, fig. 4.

The weight $k$ has a diagonal arm, which is arranged to slide through a recess on the bolt, so that when the weight falls, the bolt will be thrust forward, and when the weight is raised by means of the arm $l$, the bolt shall in like manner be drawn back; all of which will be readily understood on reference to figs. 1 and 3.

Although, on the score of economy, my arrangement of cords and friction-pulleys is to be preferred to the ordinary weighted cords for new windows, it is especially applicable to old window-frames, which cannot be readily adapted for the reception of weights.

I am aware that single and double pulleys have been arranged in a frame for the reception of a cord on a sash; but this arrangement is difficult to apply to old frames and sashes.

I am also aware that a cord has been arranged upon a single pulley, in a manner similar to mine, the pulley compressing the cord between itself and the frame, and, by the friction resulting from this pressure, keeping the sash in position.

The last-described method is objectionable, as the cord is abraded, a result which is not produced by the use of several pulleys, on which the cord is arranged as described in my improvement.

What I claim as my invention, and desire to secure by Letters Patent, is—

A cord, F, secured at opposite ends to the frame of a window, and arranged upon a series of pulleys, D D' D², as described, when the said pulleys rotate in a recess in the sash, and are so adjusted as to prevent the cord from being forced against the frame, as set forth.

In testimony whereof, I have signed my name to this specification, in the presence of two subscribing witnesses.

P. A. WILLSON.

Witnesses:
E. H. BAILEY,
O. B. PRICE.